J. W. BROWN & H. B. WEST.
Gas Apparatus.
No. 138,377. Patented April 29, 1873.
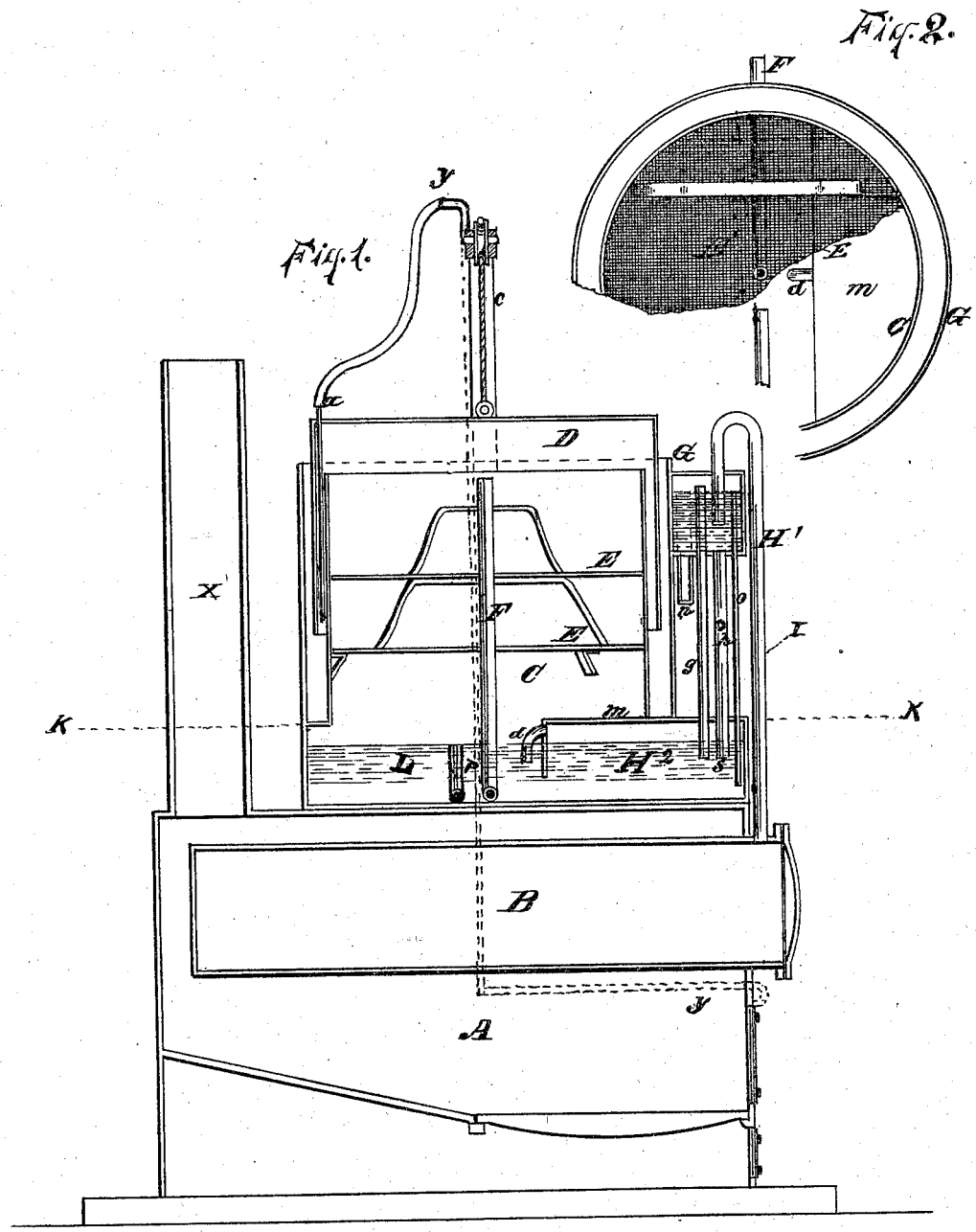

UNITED STATES PATENT OFFICE.

JOHN W. BROWN, OF BUTLERVILLE, INDIANA, AND HENRY B. WEST, OF PUT-IN-BAY, OHIO.

IMPROVEMENT IN GAS APPARATUS.

Specification forming part of Letters Patent No. 138,377, dated April 29, 1873; application filed September 2, 1872.

*To all whom it may concern:*

Be it known that we, JOHN W. BROWN, of Butlerville, Indiana, and HENRY B. WEST, of Put-in-Bay, Ohio, have invented an Improved Gas Apparatus; and we hereby declare that the following is a full, clear, and exact description thereof, which will enable those skilled in the art to make and use the same, reference being had to the accompanying drawing forming a part of this specification.

This invention relates to the improvement in the apparatus for purifying and holding coal-gas for illuminating purposes, whereby the apparatus is adapted to household or domestic use, and whereby the flow of the gas to the gas-holder is regulated automatically, and the surplus gas used as fuel; and the invention consists in the construction, arrangement, and combination into one vessel of all its parts, as will hereafter be more fully described.

Figure 1 represents a vertical elevation of the apparatus showing the generating part, with the retort in a brick furnace, and the purifying parts and holder on top of the furnace. Fig. 2 is a horizontal section or top plan of the bottom of the annular space for the gas-holder, the view being taken from the dotted line K K.

In this example, our invention is to be used without any other gas-holder, the gas being generated at the time of illumination. It is also designed to hold gas in reserve by adding an ordinary gas-holder. This apparatus consists of a furnace, retort or retorts, washer, purifier, and gas-holder all combined.

A represents fire-box and ash-pit; B, the retort; C, the combined washer and purifier; D, the gas-holder and lid of purifier. $H^1$ and $H^2$ represent the washers; I, stand and dip-pipe, which convey the gas from the retort to the washer at $H^1$. $g$ represents pipe which conveys the gas from washer $H^1$ down to washer $H^2$. $m$ is part of the bottom of purifier C, dividing washer $H^2$ from purifier C, as shown in Figs. 1 and 2, and also by the portion turned down forming a dividing washer $H^2$ from washer L. L is the third and last washer, the gas passing off of the surface of the water in washer L and through the lime which rests on the perforated plates E E, as shown in purifier C, and comes in contact with the holder D, which is also the lid of purifier C, and raises it by the pressure of the gas in the ordinary manner of raising, a holder being supported by guides and pulleys. The gas-holder is rendered gas-tight by the annular space made by the inner vessel C, and outer one G filled with water or some other liquid. When the gas-holder rises near the surface of the water in this annular space the gas is discharged by means of pipes $a$ and $y$. Pipe $a$ extends down the inside of the holder to near the bottom, and is rendered gas-tight by its dip in the water until the holder rises to the surface. The said pipe $a$ is attached to the holder, and is open when it rises out of the water, allowing the superfluous gas to escape through the pipe $y$, which is flexible, to allow the holder to rise and fall. This pipe $y$ continues on down the side of the guide-post, and on the outside of the purifier and furnace to the front end thereof beneath the retort where it opens. Its course is indicated by the dotted line $y$. Gas is only intended to flow out of this pipe when there is a surplus. When an additional holder is used to hold the gas in reserve the said pipe $y$ supplies said holder, instead of extending to the fire-box, and precisely the same regulating arrangement is constructed on the additional holder to carry the surplus gas from it to the fire-box. F is the main supply-pipe extending from the surface of the lime in purifier C to the bottom of washer L, thence out at the side of said washer, and to the structure to be illuminated. $n$ is a pipe which opens near the top of the annular space at G, and extends down on the outside of washer $H^1$ below the bottom, then returning to near the top of said washer and opening into the side thereof. Its use is to regulate the height of the water in the annular space and to supply the washers with water. $o$ is a pipe extending from the surface of the water in washer $H^1$, and dipping below the surface of the water in washer $H^2$. Its use is to regulate the height of the water in washer $H^1$, and supplies washers $H^2$ and L with water. $h$ is a pipe extending from the bottom of washer $H^1$, and dipping below the surface of the water in washer H², a cock being inserted in the center of said pipe. Its use is to drain all the water out of washer H¹ into washer H². $d$ is a short semi-circular pipe extending out of washer H² above the water, below the surface of the water in washer L. P is a tube extending from the surface of the water in washer L to the bottom, and thence off to the sewer. Its use is to regulate the height of the water in washers H² and L, and carry the tar off that floats to the surface.

The retort is made D in shape, and it and the furnace are constructed on the ordinary plan of setting retorts, whether one or more.

In this invention of ours, whether large or small, the same plan is preserved in combining the washer, purifier, and gas-holder in one vessel.

Claims.

We claim as new and desire to secure by Letters Patent—

1. The combination of the washers, purifier, and gas-holder, when the same are constructed as described and set forth.

2. The construction of the washers H¹, H², and L, and purifier C, when the same are constructed substantially as described.

3. The automatic arrangement by which the apparatus is made self-regulating, substantially as described.

J. W. BROWN.
H. B. WEST.

Witnesses:
   JOHN STONE,
   J. G. PITTS.